(No Model.)
T. DONLON.
JAW TRAP.
No. 419,188. Patented Jan. 14, 1890.
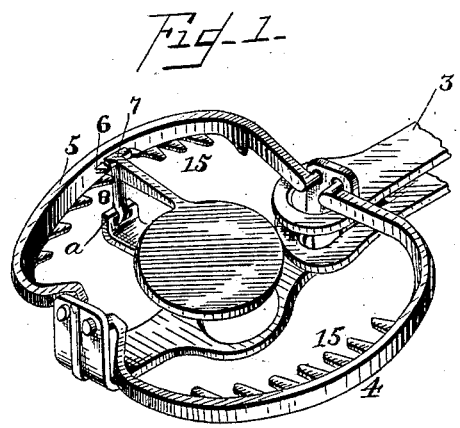
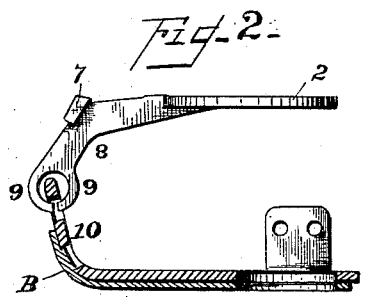
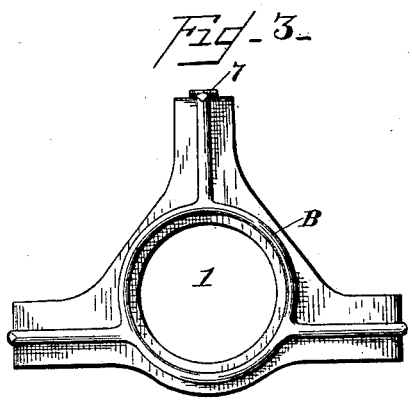
Witnesses:
L. M. Bartlett
Tilian W. Johnson
Inventor:
Thomas Donlon
By W. H. Bartlett Atty

UNITED STATES PATENT OFFICE.

THOMAS DONLON, OF CORTLAND, NEW YORK.

JAW-TRAP.

SPECIFICATION forming part of Letters Patent No. 419,188, dated January 14, 1890.

Application filed November 16, 1889. Serial No. 330,524. (No model.)

*To all whom it may concern:*

Be it known that I, THOMAS DONLON, residing at Cortland, in the county of Cortland and State of New York, have invented certain new and useful Improvements in Jaw-Traps, of which the following is a specification, reference being had therein to the accompanying drawings.

This invention relates to animal-traps of the kind generally known as "jaw-traps."

The object of my invention is to produce a trap, as will hereinafter be described, in which the base is in one piece, which can be put together without screws or rivets, and in which the base will be supported a little off the ground.

Figure 1 is a perspective view of my improved trap, the spring being partly broken away. Fig. 2 is a side view of the bait-pan and a partial section of the base. Fig. 3 is a bottom view of the base, showing rib and a portion of the engaging head on the bait-pan.

The numeral 1 indicates the base-plate, 2 the bait-pan, and 3 the spring, the spring being of common construction. The jaws 4 5 are pivoted to the base, and are actuated by the spring, as is common. The jaw 5 has an open catch 6, extending inwardly, with which catch the head 7 on the bait-pan engages to hold the trap in open or set position. The bait-pan is pivoted to an upwardly-curved portion of the base, as is shown at A in Fig. 1. The bait-pan has a downwardly-projecting arm 8, which terminates in two fingers 9 9, these fingers being integral with the arm. The base-plate 1 has an arm 10 projecting upward, and this arm is perforated at 11. The fingers 9 9 of the arm 8 are compressed into this perforation, as shown in Fig. 2, so that the bait-pan is pivoted to the base-piece by means of an integral joint—that is, without a separate pin or rivet. The catch 6 on the jaw is directly above the pivotal point of the bait-pan, said catch being of such width as to easily receive the head or bar 7 of the bait-pan, which is between the pan proper and the pivotal point, said head being too large to pass through the open catch.

The tendency of the spring to close the jaws will be sufficient to keep the head pressed tightly against the top of the catch, thereby holding the trap in open position. The rib B on the base, as shown in Fig. 3, is intended to raise the trap a little way from the ground, so that the base may not freeze down as solidly as a smooth plate would do on a level damp surface. The rib also strengthens the base-plate. The inwardly-projecting guard-teeth 15 on the jaws serve to keep the animal from poking its nose under the jaws when the trap is set, and if the animal is caught by a foot it cannot gnaw off the foot close to the inside of the jaw of the trap, being prevented by these guard-teeth. The base-plate is in one piece, the bait-pan and its arm another piece. The jaw 5 and its catch are integral, and the jaw 4 is in one piece, all preferably of malleable castings. These pieces and the spring constitute the entire trap, there being no rivets. The base-piece is bent to receive the jaws, and the fingers of the bait-pan bent around their pivot, as before stated. This makes a very simple and cheap construction, and one not likely to get out of order.

Of course it will be understood that my improved frame or base-piece can be used with the ordinary smooth jaws as well as with the guarded jaws illustrated in Fig. 1.

What I claim is—

1. In a jaw-trap, the base-piece having an upturned end or arm with a hole therein, and a bait-pan having an arm with integral fingers inturned into said hole, constituting a pivot without separate pin or rivet, in combination, substantially as described.

2. In a jaw-trap, the base-plate having an integral arm, to which the bait-pan is pivoted, and having a projecting rib at its lower side, substantially as described.

In testimony whereof I affix my signature in presence of two witnesses.

THOMAS DONLON.

Witnesses:
 JOHN W. SUGGETT,
 GEO. J. MAYCUMBER.